United States Patent Office 2,750,361
Patented June 12, 1956

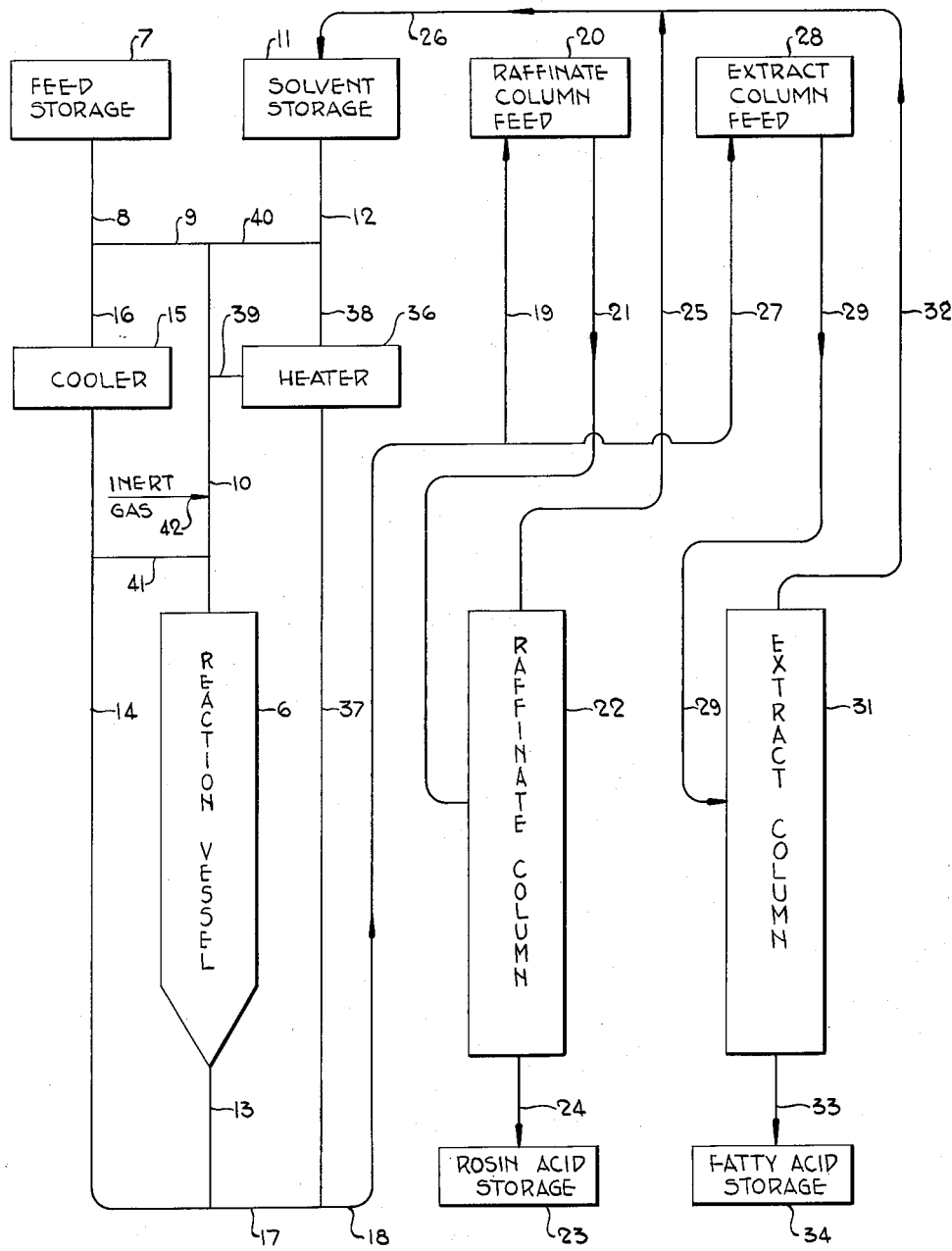

2,750,361

CYCLIC UREA-ADDUCT PROCESS

Manuel H. Gorin and Ludwig Rosenstein,
San Francisco, Calif.

Application February 24, 1954, Serial No. 412,286

2 Claims. (Cl. 260—96.5)

This application is a continuation-in-part of application Serial No. 168,685, filed June 17, 1950, now abandoned.

This invention relates to a cyclic process for treating a mixture of organic materials, at least one of which has the ability of forming a solid adduct with urea under prescribed conditions, and the remainder of which do not form such adducts. Of the materials which form adducts with urea, we mention especially the fatty acids having more than seven carbon atoms, and paraffinic hydrocarbons having more than seven carbon atoms in linear alignment. The fact that compounds of these classes form adducts with urea was disclosed in the German patent application of Bengen, O. Z. 12,438, March 18, 1940. The term "adduct-former" is employed as including those materials disclosed by Bengen and other materials which form an adduct with urea.

In a co-pending application, Serial No. 152,178 (as amended), filed March 27, 1950, there is described a new form of urea, termed "expanded urea," which is especially well adapted to operate in the continuous process about to be described. It is a light, fluffy powder which has a bulk-density of approximately 0.45 gram per cubic centimeter, and in any case not exceeding 0.50 gram per cubic centimeter. Ordinary urea of either commercial or reagent grade, after grinding, has a bulk-density of approximately 0.75 gram per cubic centimeter, and no degree of grinding alters it to less than about 0.70 gram per cubic centimeter. (Bulk-density was measured by adding successive portions of the powder to a graduated cylinder with tapping and jarring of the cylinder after each addition. When about 20 cubic centimeters had been added, the cylinder was tapped till there was no further volume change. The weight and volume were then measured. The bulk-density is the ratio of weight to volume.)

This expanded urea is further characterized by its unusually high reactivity with respect to adduct formation. Whereas adduct formation by reaction of ordinary urea with fatty acids or hydrocarbons will only proceed at a practically feasible rate if aided by a urea solvent such as water or methanol, our expanded urea will form adducts very rapidly without the aid of such accelerators; in other words, it will form adducts with suitable fatty acids, hydrocarbons, or other adduct-formers when used as the sole reagent, and by its use the introduction of extraneous materials is avoided.

To show the difference in reaction rate with respect to adduct formation the following experiment is quoted:

Urea in two different forms was used:

A. Expanding urea prepared by decomposing the adduct of urea and lauric acid by suspending in toluol and heating to 110° C. for approximately 15 minutes.

B. Merck reagent urea ground to an impalpable powder.

For the test substance a solution of "double distilled cottonseed fatty acids" dissolved in hexane was used. Equal amounts of the two forms of urea were introduced simultaneously into separate equal portions of the fatty-acid-hexane solutions. The suspensions were kept well agitated in closed vessels at 20° C. At various times, samples of the clear liquid were taken and the fatty-acid content thereof determined by titration with standard KOH in the usual manner. From the results, the percent fatty acids which had combined was calculated. The following table gives the results:

*Mol percent fatty acids to solid phase*

| Elapsed Time | Expanded Urea, percent | Ground Reagent Urea, percent |
|---|---|---|
| 14 minutes | 20 | 0 |
| 34 minutes | 27.6 | 0 |
| 52 minutes | 29.4 | 0 |
| 76 minutes | 33.6 | 0 |
| 699 minutes | | 11 |
| 704 minutes | 41.1 | |

These figures show that expanded urea has combined with 33.6% of the fatty acids present in 76 minutes, whereas the finely ground ordinary urea showed no measurable reaction in this time. 43.3% of the fatty acids present is the most that could have been taken up by the amount of urea used, so that the reaction was 78% complete in 76 minutes for the expanded urea while inappreciable for ordinary urea.

The process of this invention includes the use of this expanded urea.

Separation of mixtures of fatty acids, or of fatty acids from rosin acids, or of straight chain paraffinic hydrocarbons from others, is generally accomplished by distillation or some type of liquid-liquid extraction. These processes leave much to be desired with regard to their performance, that is, completeness of separation, and with regard to economy. The process about to be described is a distinct improvement in both respects. In broad outline the process includes the following steps: An adduct is first formed between urea and at least one of the components of the organic mixture; the adduct is then separated from non-adducted material which is recovered; the adduct is resolved into expanded urea and the adducted component which is recovered; finally, the expanded urea is returned to the first step of the process for re-use. Any solvent is recovered concurrently with the recovery of the components and is returned to the first step of the process.

The following is a convenient method of making expanded urea to start the process. Ordinary urea is first caused to react with a suitable fatty acid or suitable hydrocarbon with the aid of a urea solvent, to form an adduct, which is then removed by filtration or other convenient means and washed with a neutral solvent. It is then decomposed by suspending in a neutral solvent and raising the temperature sufficiently to decompose the adduct but not melt the urea. By "neutral solvent" we mean generally one that is not a solvent for urea, but is a solvent for the other component or components of the solid phase which are released upon elevation of the temperature. Neutral solvent will be presently defined even more precisely. At an elevated temperature the adduct will separate into its components, the urea will remain as a finely divided solid and the other component or components will go into solution in the neutral solvent. The solid urea is then removed, as by filtration, and may be washed with neutral solvent. The urea so obtained is the expanded urea employed in this invention.

Expanded ureas with different degrees of reactivity within the range of practical use can be prepared by controlling the time-temperature relation for the resolution of an adduct. This is of importance in the development of processes for separating the components of fatty acid mixtures, or of hydrocarbons. The most reactive urea is by no means always the most desirable. A highly reactive urea will combine with fatty acids or hydrocarbons with such rapidity that it is likely to set up as a solid mass and, moreover, a control of the reaction so as to achieve selectivity is almost impossible unless the reaction time is slow enough so that selectivity can be accomplished by limiting the time of contact. Towards any given sample of expanded urea, the saturated fatty acids are most reactive, the unsaturated acids with a single double bond less so; and the unsaturated acids with multiple double bonds least.

As mentioned, the reactivity of our expanded urea is a function of the time and temperature employed in the decomposition of an adduct. It is an unstable form which very slowly looses its reactivity at ordinary temperature, and more rapidly at elevated temperature. As the melting-point of urea (132° C.) is approached, the reactivity disappears very rapidly, and once melted, the re-solidified mass is the ordinary urea without any unusual reactivity.

One of the features of the process of this invention is that the urea employed remains essentially stationary in one zone of the system wherein it is subjected to a cyclic operation including adduct formation, decomposition of the adduct with concurrent reformation of expanded urea, making it available for reuse for further adduct formation. Stated in greater detail, a liquid mixture, containing at least one compound such as a fatty acid capable of forming an adduct with urea, is passed through a stationary mass of expanded urea to form an adduct with a portion of the mixture. The bulk of the unadducted material is separated from the adduct and the adduct bed washed with a solvent to remove remaining unadducted mixture, the bulk of the washings being separated from the bed of adduct. Next, the bed of adduct is kept in contact with a hot solvent to decompose it into a bed of expanded urea and free the adduct-former which goes into solution in the hot solvent. The solvent containing the adduct-former is separated from the expanded urea and the latter is washed free of the adduct-former with hot solvent. The various liquid fractions are treated separately to recover their respective contained values and establish the cycle, the solvent and expanded urea remaining in the cycle while valuable products emerge upon release from the adducted portion (extract) and the unadducted portion (raffinate) of the original mixture. If desired, the bulk of the unadducted material, which may include the washings with the solvent, can be brought into contact with one or more additional beds of expanded urea under conditions conducive to formation of other urea adducts in each of such successive zones, each expanded urea bed being subject to a similar cyclic operation. This operation can be repeated as many times as one desires a different adductible component to be separated, inasmuch as one can suit the reactivity of the urea to the adductible component to be separated to accomplish a much more complete separation of any one adductible component than is now possible by conventional methods.

It is an object of the present invention to provide a cyclic process for the treatment of a material containing one or more adductible components such as straight chain hydrocarbons or fatty acids whereby the mixture can be separated into various components as desired.

The invention includes other objects and features of advantage, some of which, together with the foregoing, will appear hereinafter wherein the preferred practice of the process of this invention is disclosed. In the drawing accompanying and forming a part hereof, the single figure is a schematic representation of suitable apparatus and a flow sheet which can be utilized to practice the present invention. In the drawing, the relation of the various pieces of apparatus, as well as the direction of flow of the various materials, is shown in some instances. However, various details of piping, valves, insulation, controls, etc., are not shown, inasmuch as these can be readily added by those skilled in the art and as desired.

The process has been particularly successful in separating one or more fatty acids from mixtures in which these occur and it will therefore be described in some detail in this connection to illustrate its practice. One such material is that known as tall-oil, which contains both fatty acids and rosin acids. For purposes of illustration, but without limiting the invention thereto, the process will be described as practiced for the separation of fatty acids from rosin acids as these occur in tall-oil. Before proceeding with a description of the process, the apparatus shown in the accompanying drawing will be described briefly.

The apparatus includes a reaction vessel 6 which in the drawing is shown as a tower fitted with suitable screens and filled with expanded urea. Tall-oil is supplied from a storage tank 7 through lines 8, 9 and 10 into the top of the tower 6. Solvent is fed into lines 40 and 10 from tank 11 through line 12 to lower the viscosity of the tall-oil so it flows readily. The reaction vessel can take any suitable form and can be a filter fitted with a vapor-tight housing, the expanded urea being the filter cake.

The solvent can be circulated from reaction vessel 6 through lines 13 and 14, through cooler 15 and thence through lines 16, 9 and 10. A by-pass 41 is provided about the cooler 15 while inert gas can be supplied through line 42. The unadducted material or raffinate is removed through lines 13, 17, 18 and 19 to raffinate storage tank 20. The raffinate is drawn off through line 21 to raffinate fractionating column 22 from which rosin acids issue to storage in tank 23 through line 24 while the solvent passes through lines 25 and 26 to solvent storage tank 11. The solution of adduct-former is removed from vessel 6 through lines 13, 17, 18 and 27 to the extract column feed tank 28 from which the solution is fed through line 29 into the extract column 31, from which solvent is taken off through lines 32 and 26 and adduct through line 33 to storage tank 34. A heater 36 is connected by lines 37, 38 and 39 between lines 17, 12 and 10.

To form the adduct, vessel 6 being filled with expanded urea, a batch of tall-oil diluted with solvent is run into vessel 6. The tall-oil solution can remain in quite contact with the bed of urea or it can be circulated through the vessel in either direction as desired. Sufficient solvent is present to provide a solution which flows readily. When the adduct has formed, the remaining mixture, the raffinate, is taken off, lines 9 and 14 being closed by suitable valves. The raffinate can be forced from the vessel by solvent from tank 11, the raffinate passing through lines 13, 17, 18 and 19 to storage tank 20 for continuous feed to the raffinate column or for contact with additional expanded urea, as desired. When the raffinate is withdrawn, the neutral solvent is circulated through the heater 36 through lines 13, 17, 37, 39 and 10 until the adduct is decomposed, the solvent being heated to an adduct release temperature which is below the melting point of the expanded urea.

When the adduct is decomposed, lines 37 and 39 are closed and the solvent is drawn off to the storage tank 28 through lines 13, 17, 18 and 27, being replaced by fresh solvent from tank 11. This solvent is fed continuously through line 29 to the fractionating column 31 from which the adduct-former issues through line 33 to tank 34 and recovered solvent returns through lines 32 and 26 to tank 11.

The expanded urea is washed with fresh solvent, the washings being sent to tank 28. The final wash is held in the system and is circulated with the incoming feed.

In operating the described equipment, the tall-oil and sufficient neutral solvent to reduce the viscosity of the tall-oil to a point whereat it can be handled readily are introduced into the reactor 6. A neutral solvent is particularly defined as any organic compound or mixture which is not a solvent for urea and which is a solvent for the material to be treated (in this case, the tall-oil) and which has boiling point preferably well below the melting point of urea, that is, below 132° C. Preferably, the boiling point of the solvent is above 50° C. because below this temperature the rate and completeness of decomposition of urea-fatty acid adducts are unfavorable. Suitable neutral solvents are hexane, iso-octane, benzol, toluol, cyclohexane, methylene chloride ($CH_2Cl_2$) and that mixture of hydrocarbons known as "petroleum-naphtha." The neutral solvents named are typical of those which can be employed and one can utilize any neutral solvent within the outlined specifications. When a solvent having a relatively low boiling point is utilized, it may be desirable to operate the reactor 6 and columns 22 and 31 under pressure so as to reach temperatures above the atmospheric boiling point of the solvent.

In reactor 6, the tall-oil solution is brought into contact with expanded urea and, depending upon the relative amounts of expanded urea and fatty acid, and temperature maintained, a selective formation of urea fatty acid adduct occurs. In general, the temperature in the reactor 6 is maintained at about atmospheric temperature, as will be presently further explained, the circulation through the reactor 6 being continued to ensure that the adduct forms substantially to equilibrium.

The temperature maintained in reactor 6 is generally atmospheric, that is, between about 10° C. and 40° C., although in some cases higher temperature can be used advantageously, particularly when a strong adduct-former is present such as stearic acid, in which case a temperature up to about 70° C. can be employed. Adjustment of the temperature enables one to maintain a control over the selectivity of adduct formation.

The temperature maintained in the reactor 6 during the adduct decomposition cycle is generally between 50° C. and 110° C. The lower the temperature of decomposition of the urea-fatty acid adduct, the more reactive will be the expanded urea which is produced. The temperature of decomposition must be such as to be practical, generally above about 50° C.

It will be noted that the ratio of solvent to organic component in the adduct formation zone is not critical. In general, the solvent volume should be kept as low as possible consistent with using sufficient solvent to overcome the volume of liquid retained by the solid phase.

In place of passing the solvent and unadducted acid through lines 13, 17, 18 and 19 to raffinate column feed-tank 20, this mixture can be further processed and brought into contact with additional expanded urea under other selective conditions of formation to remove various other fatty acids present.

The practice of the present invention will be made further apparent upon considering the following specific example:

*Example.*—A petroleum fraction in the kerosene boiling range was employed. In this example only a portion of the n-paraffins present in the original kerosene was to be removed. Adduct formation with expanded urea took place in the absence of an added solvent. A solvent was necessary, however, for washing the adduct and for its decomposition. In each cycle 1300 gallons of kerosene were mixed with a stream of 150 gallons of commercial hexane and the mixture brought into contact with 1100 pounds of expanded urea (prepared as described in column 4, lines 48–67 by decomposing with boiling hexane an adduct of urea and n-paraffins in the kerosene boiling range) for 25 minutes at room temperature. The liquid was then removed from the reactor 6 with the aid of an inert gas such as nitrogen or carbon dioxide; the urea-kerosene adduct was then washed with 150 gallons of commercial hexane which was also displaced by the inert gas. The adduct was then kept in contact with 300 gallons of commercial hexane for 25 minutes at 70° C. to decompose the solid phase in the reactor into expanded urea and kerosene, the kerosene going into the hexane. This solution was then displaced to the feed tank of a distilling tower by an inert gas. The expanded urea remaining in the reactor was washed free of kerosene with hot hexane and was then ready for re-use. From the solution plus the washing, 350 pounds per hour of a mixture of n-paraffins in the kerosene boiling range were obtained by distilling off the hexane. The n-paraffins thus produced are useful as starting materials for the synthesis of a wide range of useful chemical products and as special solvents. Their sweet odor and lack of characteristc kerosene odor is particularly outstanding. The original kerosene, somewhat depleted in n-paraffin content and containing some commercial hexane, was also sent to a still to strip off the hexane. It was sent to storage for conventional use.

From the foregoing, it will be apparent that we have provided a novel, simple cyclic process which can be applied readily to the separation of various components forming adducts with expanded urea as the sole reagent. While we have discussed the invention with respect to the separation of fatty acid from rosin acids, fatty acids from one another and certain hydrocarbons from a mixture thereof, it will be obvious to those skilled in the art that the invention can be applied to the separation of various mixtures including one or more adduct-formers.

We claim:

1. In a process for recovering straight-chain-paraffinic hydrocarbons of at least seven carbon atoms from a hydrocarbon fraction, the steps of adding as the sole reagent to the hydrocarbon fraction at a temperature below about 70° C., expanded urea characterized by having a bulk-density not exceeding 0.50 gram per cubic centimeter, and being capable, when used as the sole reagent, of showing substantial adduct formation within one hour with linear, saturated fatty acids having at least twelve carbon atoms, to form adduct of said paraffinic hydrocarbons and urea, and separating the adduct from the unadducted hydrocarbons.

2. In a process as in claim 1, wherein the hydrocarbon fraction is in the kerosene boiling range, and wherein the adduct is formed below 50° C.

References Cited in the file of this patent
UNITED STATES PATENTS 2,577,202    Lien et al. _____ Dec. 4, 1951